US012391796B2

United States Patent
Konda et al.

(10) Patent No.: US 12,391,796 B2
(45) Date of Patent: Aug. 19, 2025

(54) METHOD FOR THE MANUFACTURE OF POLYCARBONATE

(71) Applicant: SABIC GLOBAL TECHNOLOGIES B.V., Bergen Op Zoom (NL)

(72) Inventors: Shivakumar Konda, Tamilnadu (IN); Chelsea Schmidt, Wadesville, IN (US); Indira Jyothi Polasa, Maastricht (NL); Jordi Calveras, Taunton, MA (US); Thomas Paul Kanjirathadathil, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 306 days.

(21) Appl. No.: 17/796,525

(22) PCT Filed: Feb. 9, 2021

(86) PCT No.: PCT/EP2021/053015
§ 371 (c)(1),
(2) Date: Jul. 29, 2022

(87) PCT Pub. No.: WO2021/170386
PCT Pub. Date: Sep. 2, 2021

(65) Prior Publication Data
US 2023/0348668 A1 Nov. 2, 2023

(30) Foreign Application Priority Data
Feb. 28, 2020 (EP) .................................... 20159960

(51) Int. Cl.
*C08G 64/10* (2006.01)
*C08G 64/24* (2006.01)
*C08L 69/00* (2006.01)

(52) U.S. Cl.
CPC ............. *C08G 64/10* (2013.01); *C08G 64/24* (2013.01); *C08L 69/00* (2013.01); *C08L 2207/20* (2013.01)

(58) Field of Classification Search
None
See application file for complete search history.

(56) References Cited

U.S. PATENT DOCUMENTS

| 5,118,726 A | * | 6/1992 | Mizutani | ................. C08L 69/00 524/378 |
| 5,208,389 A | | 5/1993 | McKinnie et al. | |

(Continued)

FOREIGN PATENT DOCUMENTS

JP        02265957 A       10/1990

OTHER PUBLICATIONS

Sigma-Aldrich, "Certificate of Analysis—Certified Reference Material," Apr. 4, 2019 (Year: 2019).*

(Continued)

*Primary Examiner* — Randy P Gulakowski
*Assistant Examiner* — Audra J Destefano
(74) *Attorney, Agent, or Firm* — CANTOR COLBURN LLP

(57) ABSTRACT

The present invention relates to a method for the manufacture of a (co)polycarbonate comprising reacting tetrabromo bisphenol A and optionally one or more bisphenol comonomer(s) with phosgene wherein the tetrabromo bisphenol A contains an amount of tetrabromo bisphenol A dimer of at most 3.0 wt. % based on the weight of the tetrabromo bisphenol A, determined after heat treating the tetrabromo bisphenol A at a temperature of 260° C. for a period of 15 minutes.

12 Claims, 2 Drawing Sheets

(56) References Cited

U.S. PATENT DOCUMENTS

| | | | |
|---|---|---|---|
| 5,237,112 A | 8/1993 | Larose | |
| 5,672,664 A * | 9/1997 | DeRudder | C08L 69/00 525/470 |
| 2012/0251750 A1 | 10/2012 | Sybert et al. | |

OTHER PUBLICATIONS

Marks, Physical, Thermomechanical, and Rheological Properties of Bisphenol A-Tetrabromobisphenol A Copolycarbonates, Journal of Applied Polymer Science, 52, 1809-1814, 1994 (Year: 1994).*

International Search Report for International Application No. PCT/EP2021/053015, International Filing Date Feb. 9, 2021, Date of Mailing, May 6, 2021, 6 pages.

Written Opinion for International Application No. PCT/EP2021/053015, International Filing Date Feb. 9, 2021, Date of Mailing, May 6, 2021, 8 pages.

* cited by examiner

METHOD FOR THE MANUFACTURE OF POLYCARBONATE

CROSS REFERENCE TO RELATED APPLICATIONS

This application is a National Stage application of PCT/EP2021/053015, filed Feb. 9, 2021, which claims the benefit of European Application No. 20159960.2, filed Feb. 28, 2020, both of which are incorporated by reference in their entirety herein.

FIELD

The present invention relates to a method for the manufacture of a (co)polycarbonate, comprising reacting tetrabromo bisphenol A and optionally one or more bisphenol co-monomer(s) with phosgene. The present invention further relates to the obtained (co)polycarbonate, as well as compositions and/or articles comprising the (co)polycarbonate.

BACKGROUND

Polycarbonates or co-polycarbonates manufactured by reacting tetrabromo bisphenol A (TBBPA) are known per se. Typical copolycarbonates are polycarbonates that contain structural units from both TBBPA as well as bisphenol A (BPA). Such copolymers of TBBPA and BPA are generally used to enhance the flame retardancy properties of regular BPA based polycarbonate.

Polycarbonates or co-polycarbonates based on TBBPA may be sensitive to yellowing upon ageing. The present inventors found that TBBPA materials as received from suppliers may be comparable in terms of purity, yet may result in (co)polycarbonates with mutually different yellowness indices.

SUMMARY

It is therefore an object of the present invention to provide a method for the manufacture of (co)polycarbonates comprising TBBPA wherein the ageing, which can be observed by yellowing, of such (co)polycarbonates is reduced to a minimum.

It is another object of the present invention to provide a composition comprising a of (co)polycarbonates comprising TBBPA wherein the ageing, which can be observed by yellowing, of such (co)polycarbonates is reduced to a minimum.

It is yet a further object of the present invention to provide a method for the manufacture of (co)polycarbonates comprising TBBPA wherein variations in the yellowness index of the obtained (co)polycarbonates is reduced to a minimum.

The present inventors surprisingly found that when TBBPA is heat treated at a temperature of 260° C. for a time of 15 minutes followed by cooling to room temperature, 23° C., it is possible to distinguish TBBPA grades which before such heat treatment appeared to be of very similar or even identical quality. Accordingly a more appropriate selection of the TBBPA can be made resulting in a more reliable manufacturing operation in terms of yellowness of the final (co)polycarbonate. In addition, this test method may also be used in feedback loop during the manufacture of TBBPA for further purification.

Accordingly the present invention relates to a method for the manufacture of a (co)polycarbonate comprising reacting tetrabromo bisphenol A and optionally one or more bisphenol co-monomer(s) with phosgene wherein the tetrabromo bisphenol A contains an amount of tetrabromo bisphenol A dimer of at most 3.0 wt. % based on the weight of the tetrabromo bisphenol A, determined after heat treating the tetrabromo bisphenol A at a temperature of 260° C. for a period of 15 minutes.

DETAILED DESCRIPTION

Figure 1:
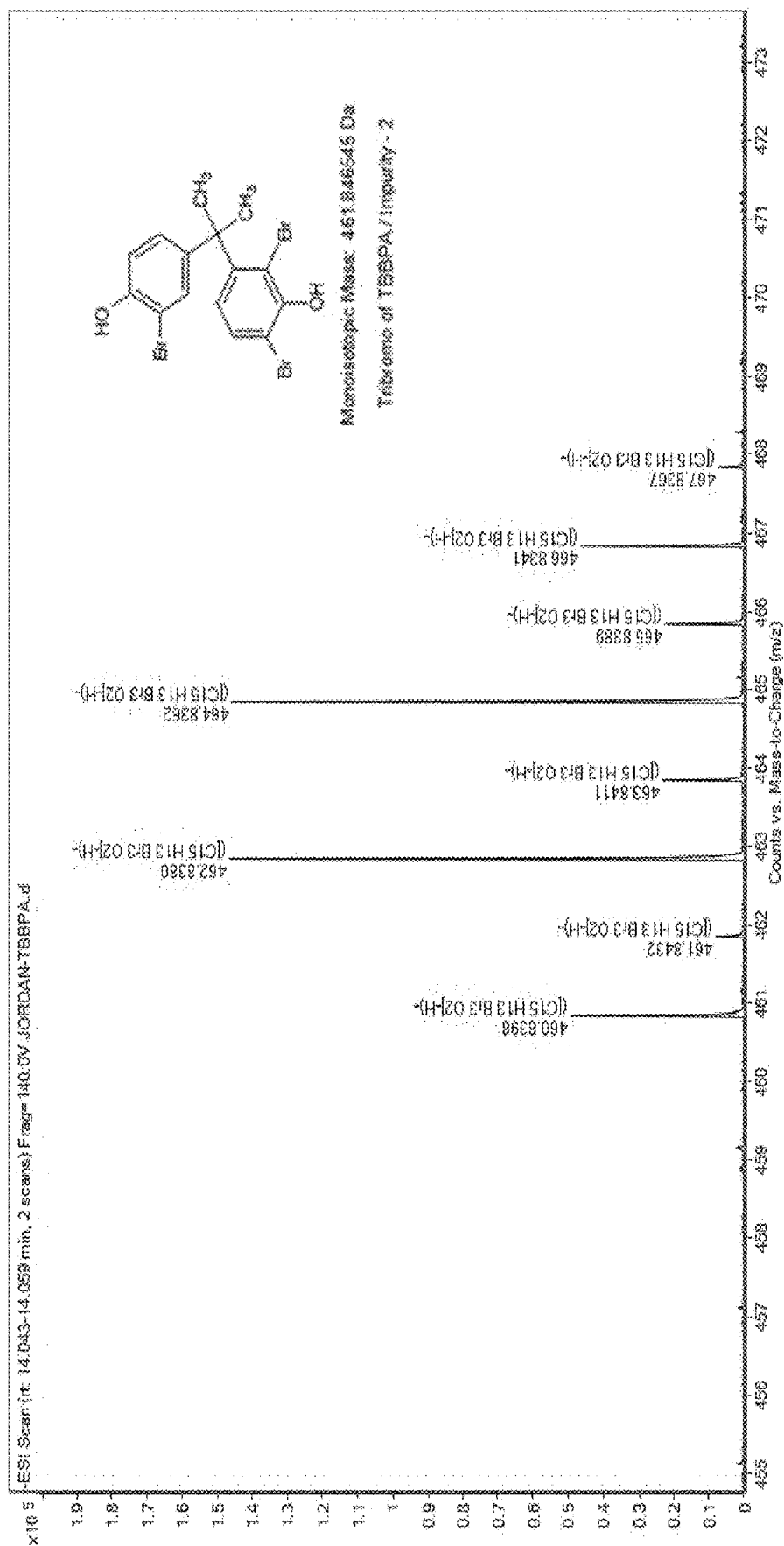
FIG. 1 shows the mass spectroscopy analysis results for tribromo TBBPA impurity.

For the avoidance of doubt it is noted that the method itself does not require heating the TBBPA before it is used in the method of the invention. Rather the heat treatment is merely part of the analysis method to determine the quality of TBBPA. Thus in practice, a sample of a batch of TBBPA is analysed prior to the batch, obviously excluding the analysed sample, being used to manufacture the copolymer.

The present inventors surprisingly found that the heat treatment of TBBPA results in the formation of, among others, a dimer impurity. The dimer impurity was found to correlate to the yellowness index of the final (co)polycarbonate. The reason for the formation of the dimer impurity is not entirely clear to the present inventors.

Based on analytical techniques the present inventors found that the chemical structures of the dimers correspond to the formula's II and III below. Accordingly the TBBPA dimer preferably comprises or consists of one or both of the compounds of the formula II or III

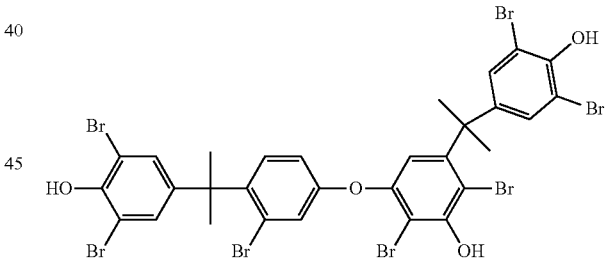

Formula II

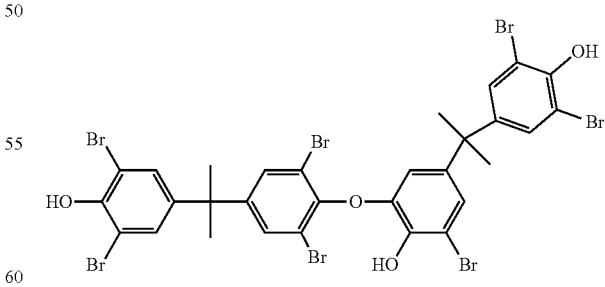

Formula III

The tetrabromo bisphenol A preferably contains an amount of leachable bromine of at most 50 ppm based on the weight of the tetrabromo bisphenol A, determined after heat treating the tetrabromo bisphenol A at a temperature of 260° C. for a period of 15 minutes in accordance with the measurement method as disclosed in the specification. The term leachable bromine means bromine atoms or ions that can leach from the composition. The present inventors believe these are predominantly bromine ions. Thus, and for the avoidance of doubt the term "leachable bromine" in the context of the invention refers to the amount of single bromine atoms or ions, i.e. should not be confused with Br2. It is preferred that the amount of leachable bromine is at most 45 ppm and may be at least 10 or 20 ppm.

The tetrabromo bisphenol A preferably has a transmittance at a wavelength of 470 nm of at least 60%, preferably at least 70%, determined after heat treating the tetrabromo bisphenol A at a temperature of 260° C. for a period of 15 minutes, measured at 23° C. on a 60 wt. % solution of the heat treated tetrabromo bisphenol A in acetone with an optical path length of 10 mm.

Thus, the tetrabromo bisphenol A raw material is first heat treated, then cooled down again to room temperature (23° C.), then dissolved in acetone and then subjected to UV measurement. The spectrum between 300 to 1000 nm is recorded. The solution is a 60 wt. % solution in acetone.

The polycarbonate of method of the invention is preferably a copolymer, or copolycarbonate wherein the amount of tetrabromo bisphenol A is 30-70 wt. % and the amount of one or more co-monomer is 70-30 wt. % based on the total amount of tetrabromo bisphenol A and co-monomers. More preferably the amount of TBBPA is from 40-60 wt. % and the amount of one or more comonomers from 60-40 wt. %. Even more preferably the amount of TBBPA is from 45-550 wt. % and the amount of one or more comonomers from 55-45 wt. %.

It is preferred that the one or more bisphenol co-monomer has the formula

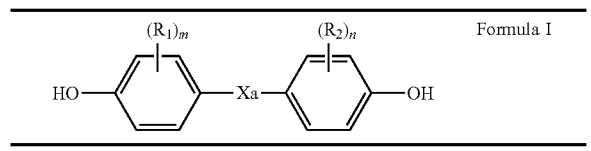

Formula I wherein R1 and R2 each independently represent hydrogen, or a monovalent hydrocarbon group; m and n are each independently integers from 0 to 4, Xa is selected from the group consisting of the structures

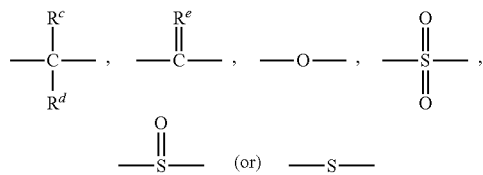

wherein Rc and Rd each independently represent a hydrogen atom or a monovalent linear or cyclic hydrocarbon group, and Re is a divalent hydrocarbon group, oxygen, or sulfur.

It is preferred that the copolycarbonate consists of structural units derived from BPA and TBBPA. In other words, it is preferred that in the method of the invention TPBA and BPA are reacted with phosgene resulting in a copolycarbonate. For the avoidance of doubt, the amount of TBBPA employed in this preferred aspect of the invention is preferably from 30-70 wt. %, preferably from 40-60 wt. %, more preferably from 45-55 wt. % and the amount of BPA is preferably from 70-30 wt. %, more preferably from 60-40 wt. %, even more preferable from 55-45 wt. %.

The monomers are reacted with phosgene using the well-known interfacial process for the manufacture of polycarbonate.

The present invention also relates to a (co)polycarbonate obtained or obtainable by the method of the invention. The weight average molecular weight of the (co)polycarbonate may be from 10,000 to 50,000 g/mol such as from 15,000 to 30,000 or preferably from 20,000 to 24,000 g/mol, most preferably from 22,500-24,500 g/mol as determined with gel permeation chromatography using polycarbonate standards.

The (co)polycarbonate is preferably a copolymer of tetrabromo-bisphenol A and bisphenol A, wherein the amount of tetrabromo bisphenol A in the method was from 40-60 wt. % and the amount of bisphenol A from 60-40 wt. % based on the combined weight of said bisphenols, and said copolycarbonate preferably has a yellowness index (YI) of at most 1.8, determined in accordance with ASTM D1925-70 on an injection moulded sample having a thickness of 3.2 millimeter.

In another preferred aspect the present invention relates to a composition comprising the (co)polycarbonate disclosed herein and at least one further polymer, preferably selected from the group consisting of polycarbonate, polyethylene terephthalate, polybutylene terephthalate, acrylonitrile-butadiene styrene copolymer, styrene acrylonitrile copolymer and mixtures of at least two of the foregoing polymers.

Compositions wherein the polymer fraction consist of polycarbonate and the (co)polycarbonate disclosed herein typically contain from 30 to 70 wt. % of polycarbonate and from 70 to 30 wt. % of (co)polycarbonate on the basis of combined amounts of polycarbonate and (co)polycarbonate. More preferably such compositions contain from 40 to 60 wt. % polycarbonate and from 60 to 40 wt. % of (co) polycarbonate.

Compositions wherein the polymer fraction contains polycarbonate may contain from 30 to 70 wt. %, preferably 40 to 60 wt. %, of (co)polycarbonate disclosed herein and from 70 to 30 wt. %, preferably from 60 to 40 wt. %, of polycarbonate based on the combined amount of polycarbonate and (co)polycarbonate.

The composition may further comprise further flame retardants such as alkali or earth-alkali metal salts for example potassium perfluorobutane sulfonate (Rimar salt), or phosphorous based flame retardants. In addition to that the compositions may contain anti-drip agents such as poly-tetrafluoro-ethylene.

In an aspect the composition disclosed herein comprises at least one further polymer obtained from post-consumer recycled waste. In an aspect of the invention it is preferred that the composition comprises a polycarbonate that was obtained from post-consumer rec The present invention further relates to an article comprising or consisting of the (co)polycarbonate or the composition disclosed herein, said article preferably being an automobile part, a railway compartment part, an aircraft part, a heat reflector, a light reflector, component of a medical device, a food tray, a food dish, an optical connector, a solar apparatus, an electrical junction box, an electrical connector, an electrical vehicle charger, an outdoor electrical enclosure, a photovoltaic frame and a circuit breaker The present invention further relates to the use of the (co)polycarbonate disclosed herein as a flame retardant, refractive index enhancer, melt flow enhancer, heat stabilizer, scratch resisting agents, or a combination comprising at least one of the foregoing.

The present invention further relates to the use of tetrabromo bisphenol A containing an amount of tetrabromo bisphenol A dimer of at most 3.0 wt. % based on the weight of the tetrabromo bisphenol A, determined after heat treating the tetrabromo bisphenol A at a temperature of 260° C. for a period of 15 minutes, for the manufacture of a polycarbonate or a polycarbonate copolymer, for reducing the Yellowness Index of said polycarbonate (co)polymer or a composition containing said (co)polymer, compared to an otherwise identical (co)polymer or composition manufactured with a tetrabromobisphenol A containing more than 3.0 wt. % of said dimer.

For this use it is preferred that the tetrabromo bisphenol A contains an amount of leachable bromine (Br) of at most 50 ppm based on the weight of the tetrabromo bisphenol A, determined after heat treating the tetrabromo bisphenol A at a temperature of 260° C. for a period of 15 minutes in accordance with the measurement method as disclosed herein.

It is further preferred that the tetrabromo bisphenol A has a transmittance at a wavelength of 470 nm of at least 60%, preferably at least 70%, determined after heat treating the tetrabromo bisphenol A at a temperature of 260° C. for a period of 15 minutes, measured at 23° C. on a 60 wt. % solution of the heat treated tetrabromo bisphenol A in acetone with an optical path length of 10 mm.

In an aspect the present invention further relates to a method for the manufacture of a (co)polycarbonate comprising the steps of
  i) determining an amount of tetra bromo-bisphenol A dimer in a batch of tetra bromo bisphenol A raw material, wherein the amount of said dimer is determined after heat treating the tetrabromo bisphenol A at a temperature of 260° C. for a period of 15 minutes,
  ii) if said amount of dimer is at most 3.0 wt. % based on the weight of the tetrabromo bisphenol A, reacting at least part of said batch of tetrabromo bisphenol A and optionally one or more bisphenol co-monomer(s) with phosgene so as to form said (co)polycarbonate, or
  iii) if said amount of dimer is more than 3.0 wt. % obtaining another batch of tetra bromo bisphenol A raw material and repeating step i), where the batch of raw material containing more than 3.0 wt. % of dimer is not used to manufacture (co)polycarbonate.

In this aspect it is preferred that in a step iv) (co) polycarbonates manufactured using different batches of tetra bromo bisphenol A raw material, each having a dimer content of at most 3.0 wt. % are combined and/or mixed.

contains an amount of tetrabromo bisphenol A dimer of at most 3.0 wt. % based on the weight of the tetrabromo bisphenol A, determined after heat treating the tetrabromo bisphenol A at a temperature of 260° C. for a period of 15 minutes.

Heat Treatment

Samples of tetra bromo bisphenol A were heat treated by placing a sealed container containing the raw material in a furnace conditioned at 260° C. for a period of 15 minutes. After the treatment the samples were cooled to room temperature (23° C.) by taking the samples out of the furnace.

Leachable Bromine 0.5 g of TBBPA sample was weighed accurately in triplicates in a GC vial. The cap has been crimped with septa attached to the cap. The vials were heat treated in accordance with the procedure above. After the sample was cooled down to room temperature, 5 mL of dichloromethane was added to dissolve the sample completely. Using a syringe, 2 mL of the sample solution was then transferred to a polypropylene tube and 8 mL of deionized water was added. The tubes were then closed and fixed in a horizontal reciprocating shaker followed by shaking for 12 hours. During this time the extractable anions present in the organic dichloromethane phase will be extracted by the aqueous phase. After the extraction process, the aqueous part was filtered using a 0.4 micron syringe filter and analyzed for bromide with an ion chromatographer having an AS19 analytical column with an AG19-HC Guard column. The Chromatography has been connected with ASRS 300, 4 mm suppressor and the detection by conductivity detector.

The data has been processed by using Chromeleon software.

Instrument Conditions
  Column AS19 Analytical column
  Guard column AG19-HC Guard column
  Suppressor ASRS 300 4 mm Suppressor
  Detector Conductivity detector
  Suppressor current 50 mA
  Injection volume 250 µL
  Mobile phase A: 100 mM NaOH in DI water B: DI water
  Flow rate 1.0 mL/min
  Runtime 20 min
Standard Solutions for Calibration:
  NIST (National Institute of Standards and Technology, www.nist.gov) traceable 1000 ppm bromide standard has been used as the stock for calibrating the instrument. Calibration standards has been prepared from 0.1 ppm to 20 ppm by diluting the stock solution appropriately using deionized water. After analysis of calibration standards, a linear plot has been made with concentration against instrument response (peak area). The bromide concentration of the sample has been estimated by using a linear equation.

Purity and Dimer Content

The purity and dimer content was determined using known HPLC and mass spectroscopy techniques.

HPLC analysis was performed by using Agilent 1200 HPLC system to determine the purity of the TBBPA monomer. The initial mobile phase consisted of 0.02% v/v ortho phosphoric acid and acetonitrile in the ratio of 80:20. The percentage of acetonitrile was raised to 95% in 20 minutes and maintained the same composition up to 5 min, acetonitrile composition changed to initial composition of 20% at 28 min, the column equilibrated for 4 min. The mobile phase flow rate at 1 mL/min and injection volume of 5 µL was fixed. Agilent Technologies Poroshell 120, EC C18, 2.7 Um, 4.6×50 mm used for chromatographic separations. The column temperature was maintained at 40° C. during the analysis.

Liquid Chromatography (LC) was performed by using an Agilent 1290 UPLC (Ultra Pressure Liquid Chromatography) system for chromatographic separations and to determine the mass of the impurity by high resolution mass spectroscopy (HRMS). The initial mobile phase consisted of 10 mmol/l ammonium acetate in water and acetonitrile in the ratio of 80:20. The percentage of acetonitrile was raised to 95% in 20 minutes and maintained the same composition up to 5 min. The acetonitrile composition was changed to the initial composition of 20% at 28 min and the column was equilibrated for 4 min. The mobile phase flow rate at 1 mL/min and injection volume of 5 µL was fixed. Agilent Technologies Poroshell 120, EC C18, 2.7 Um, 4.6×50 mm (column) used for chromatographic separations. The column temperature was maintained at 40° C. during the analysis.

Following the HPLC analysis, the TBBPA monomer samples were analyzed by high-resolution mass spectroscopy (HRMS). HRMS uses Q-TOF under electro-spray ionization negative ionization mode, dry gas temperature is 3000° C., at a drying gas flow of 8 L/min, a nebulizer of 50 psi and sheath gas flow temperature of 3500° C. and flow of 11 L/min with 140 (V) fragmentor voltage and at a capillary voltage of 3500 V The mass range was scanned up to 100-3200 Da with 1 spectra/s acquisition speed.

Figure 2:
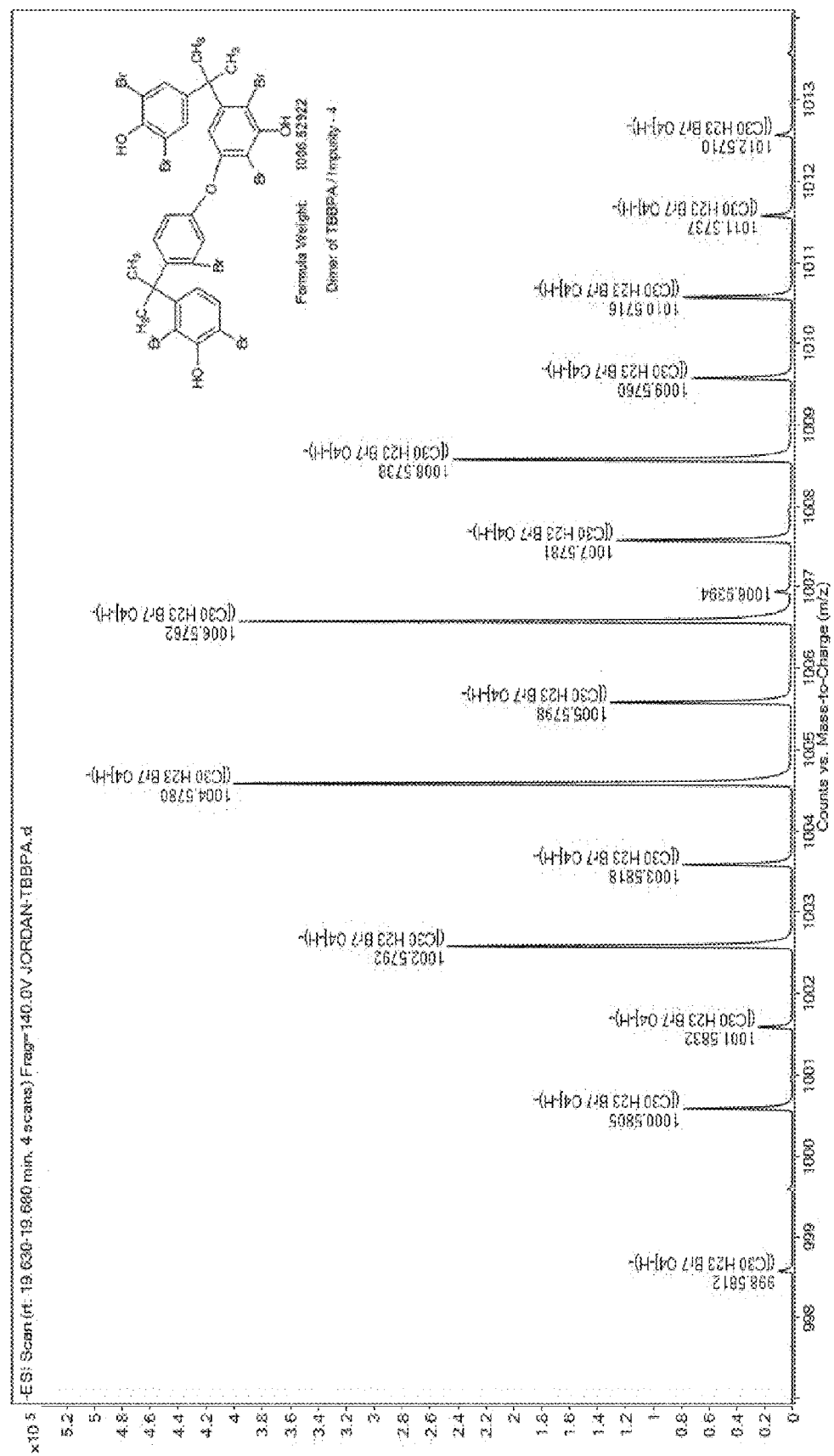
FIG. 2 shows the mass spectroscopy analysis result for the dimer impurity of TBBPA.

The presence of impurities such as tribromo TBBPA impurity and dimer impurity of TBBPA was confirmed by the mass spectroscopy analysis. Peak at ~14.0 min RT and ~20.0 RT for the corresponding deprotonated masses of 460 and 998 were observed. The molecular formula of ~14.0 min RT was found to be $C_{15}H_{13}Br_3O_2$ and for ~21.0 min RT was found to be $C_{30}H_{23}Br_7O_4$ and the proposed structures for the corresponding molecular formulae of tribromo TBBPA impurity and dimer impurity of TBBPA were identified as shown in FIG. 1 and FIG. 2 respectively.

Yellowness Index

The Yellowness Index (YI) was determined on injection moulded plaques having a thickness of 3.2 mm in accordance with ASTM D1925-70.

UV-VIS Spectroscopy

A 60 wt. % solution of heat treated TBBPA in acetone was subjected to a UV-VIS spectroscopy measurement test to measure and numerically determine the solution color absorbance at either 470 nm or 332 nm in order to compare materials. An Agilent 8453 UV-Vis spectrophotometer was used.

Materials

The following TBBPA materials were used in the examples.

TABLE 1

| TBBPA | Purity % | bromine content [wt. %] | Melting point [° C.] | APHA value |
|---|---|---|---|---|
| #1 | 99.5 | 58 | 182 | 10 |
| #2 | N/A | 59 | 181 | N/A |
| #3 | 99 | 59 | 181 | 10 |
| #4 | 99 | 58 | 181 | 20 |
| #5 | N/A | 58 | 179 | 15 |
| #6 | | 59 | 179-182 | N/A |

EXAMPLES

TABLE 2

| | Color [as observed] | | Purity [wt. %] | Dimer [wt. %] | T % @ 470 nm | Leachable Br [ppm] |
|---|---|---|---|---|---|---|
| | Before | After | Before | After | After | After |
| #1 | clear | Light yellow | 99.2 | 3.0 | 80 | 36 |
| #2 | clear | Light yellow | 99.4 | 2.7 | 78 | 29 |
| #3 | clear | Light yellow | 99.7 | 2.9 | 73 | 42 |
| #4 | clear | Dark yellow | 99.8 | 3.4 | 78 | 110 |
| #5 | clear | Dark yellow | 99.9 | 4.0 | 33 | 182 |
| #6 | clear | Dark yellow | 99.7 | 4.2 | 40 | 183 |

The table above is presented in support of the invention disclosed herein and provides data on several key parameters of the tetra bromo bisphenol A monomer before and after heat treatment.

The inventors first of all observed that before any heat treatment all samples had a purity of well over 99% and showed no visual difference in terms of color. Thus, all tested materials showed were clear and transparent. After heat treatment differences in color tone were observed and in particular samples #4, #5 and #6 showed a dark yellow to brown color where samples #1, #2 and #3 were light yellow and more transparent in color. This visual observation was also confirmed using UV-VIS spectroscopy. All of samples #4, #5 and #6 showed a relatively high dimer and leachable bromine content.

Brominated polycarbonate copolymers were prepared using an interfacial process. In a formulation tank, 2250 g of TBBPA and 2250 g of EPA monomers, 12 l of methylene dichloride, 100 g of caustic, and 12 l of water were added and stirred for about 1 hour time. After stirring for an hour time, the mixture was transferred into a reactor and rinsed the formulation tank with methylene chloride. Further, para-cumylphenol (PCP), trimethylamine (TEA) and sodium gluconate were also added into the reactor. After addition, phosgenation of the reaction mixture was carried out at a pH of about 9.5 to 9.8. The said process was utilized to produce brominated polycarbonate using different TBBPA samples. The obtained brominated polycarbonate was then molded as a color chip by a molding method. The amount of TBBPA incorporated into each copolycarbonate was the same for each polymer and each polymer had a weight average molecular weight of about 22,500 g/mol.

TABLE 3

| Sample | Dimer impurity after aging [wt. %] | YI |
|---|---|---|
| CE1 | >3 | 2.8 |
| CE2 | >3 | 2.1 |
| E1 | 2.9 | 1.9 |
| E2 | 2.7 | 1.8 |
| E3 | <3 | 1.9 |
| E4 | <3 | 1.8 |
| CE5 | >4.0 | 2.7 |
| CE6 | >4.0 | 2.7 |
| CE7 | >4.0 | 2.7 |

The invention claimed is:

1. A method for the manufacture of a (co)polycarbonate comprising reacting tetrabromo bisphenol A and optionally one or more bisphenol co-monomer(s) with phosgene wherein the tetrabromo bisphenol A contains an amount of tetrabromo bisphenol A dimer of at most 3.0 wt. % based on the weight of the tetrabromo bisphenol A, determined after heat treating the tetrabromo bisphenol A at a temperature of 260° C. for a period of 15 minutes.

2. The method of claim 1 wherein the tetrabromo bisphenol A contains an amount of leachable bromine of at most 50 ppm based on the weight of the tetrabromo bisphenol A, determined after heat treating the tetrabromo bisphenol A at a temperature of 260° C. for a period of 15 minutes.

3. The method of claim 1 wherein the tetrabromo bisphenol A has a transmittance at a wavelength of 470 urn of at least 60%, determined after heat treating the tetrabromo bisphenol A at a temperature of 260° C. for a period of 15 minutes, measured at 23° C. on a 60 wt. % solution of the heat treated tetrabromo bisphenol A in acetone with an optical path length of 10 mm.

4. The method of claim 1, wherein the amount of the tetrabromo bisphenol A is 30-70 wt % and the amount of the one or more bisphenol co-monomer is 70-30 wt. % based on the total amount of the tetrabromo bisphenol A and the one or more bisphenol co-monomers.

5. The method of claim 1, wherein the one or more bisphenol co-monomer has the formula

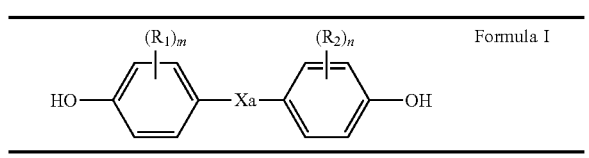

Formula I wherein $R_1$ and $R_2$ each independently represents hydrogen, or a monovalent hydrocarbon group; m and n are each independently an integer from 0 to 4, Xa has a structure of

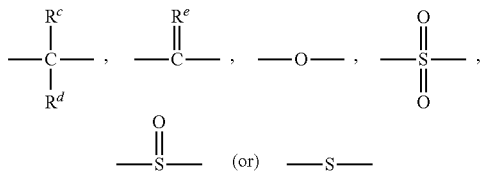

wherein $R^c$ and $R^d$ each independently represents a hydrogen atom or a monovalent linear or cyclic hydrocarbon group, and $R^e$ is a divalent hydrocarbon group, oxygen, or sulfur.

6. The method of claim 1, wherein the tetrabromo bisphenol A dimer comprises or consists of one or both of the compounds of the formula II or III

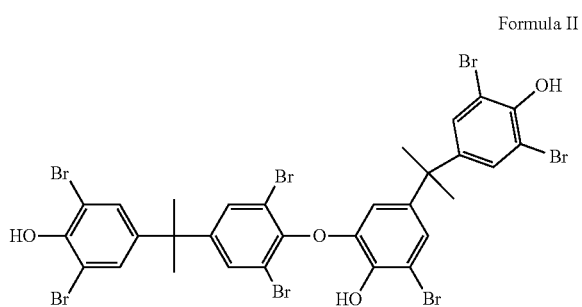

Formula II

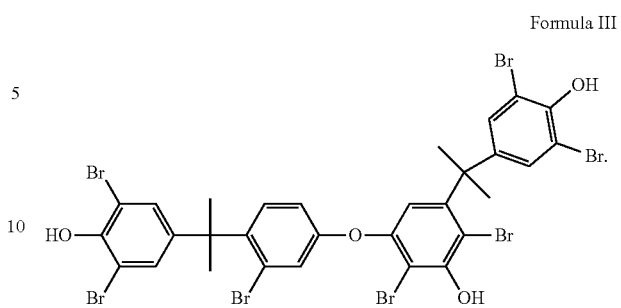

Formula III

7. The method of claim 1, wherein said (co)polycarbonate has a reduced yellowness index as compared to an otherwise identical (co)polycarbonate manufactured with a tetrabromobisphenol A containing more than 3.0 wt. % of said dimer.

8. The method of claim 1, wherein said (co)polycarbonate has a yellowness index of at most 1.8, determined in accordance with ASTM D1925-70 on an injection moulded sample having a thickness of 3.2 millimeter.

9. A copolycarbonate obtained or obtainable by the method of claim 1 wherein the copolycarbonate is a copolymer of the tetrabromo bisphenol A and bisphenol A, wherein the amount of the tetrabromo bisphenol A in the method was from 40-60 wt. % and the amount of bisphenol A was from 60-40 wt. % based on the combined weight of said bisphenols, and wherein said copolycarbonate has a yellowness index (YI) of at most 1.8, determined in accordance with ASTM D1925-70 on an injection moulded sample having a thickness of 3.2 millimeters.

10. A composition comprising the copolycarbonate according to claim 9 and at least one further polymer.

11. The composition of claim 10 wherein the at least one further polymer was obtained from post-consumer recycled waste.

12. An article comprising or consisting of the copolycarbonate of claim 9.

* * * * *